United States Patent

[11] 3,628,856

[72] Inventors: Vernon H. Jungjohann;
Henry S. Adamski, both of Rochester, N.Y.;
Stephen M. Richardson, Acton, Mass.
[21] Appl. No. 797,909
[22] Filed Feb. 10, 1969
[45] Patented Dec. 21, 1971
[73] Assignee Eastman Kodak Company
Rochester, N.Y.

[54] FILMSTRIP ADAPTER FOR SLIDE PROJECTORS
5 Claims, 6 Drawing Figs.

[52] U.S. Cl............................................. 353/68
[51] Int. Cl............................................. G03b 21/00, G03b 23/00
[50] Field of Search............................... 226/127, 76; 353/26, 119, 120; 352/136, 137; 357/26, 120

[56] References Cited
UNITED STATES PATENTS

| | | | |
|---|---|---|---|
| 1,893,359 | 1/1933 | Davidson | 353/119 X |
| 2,793,563 | 5/1957 | Koskela | 353/119 |
| 3,124,035 | 3/1964 | Lucas | 353/119 |
| 3,446,551 | 5/1969 | Platt | 353/120 X |

FOREIGN PATENTS

| | | | |
|---|---|---|---|
| 596,653 | 1/1948 | Great Britain | 353/119 |
| 534,375 | 3/1922 | France | 355/170 |
| 105,955 | 8/1924 | Switzerland | 353/68 |

*Primary Examiner*—Leonard Forman
*Assistant Examiner*—A. J. Mirabito
*Attorneys*—Robert W. Hampton and Milton S. Sales

ABSTRACT: A slide projector adapter for showing still pictures from a filmstrip includes a film gate and a drive sprocket adjacent the film gate. The adapter may be used to show long or short films, with or without leaders. The filmstrip is fed from a molded supply spool to a spring-biased takeup spool. A condenser tube is aligned with the film gate for insertion into the light projecting tube of the projector. The adapter is held in such a manner that it can be rotated to accommodate either horizontal or vertical film formats. A film advance mechanism includes a device for precisely framing the initial projected image.

VERNON H. JUNGJOHANN
HENRY S. ADAMSKI
STEPHEN M. RICHARDSON
INVENTORS

BY Milton S. Sales

Robert W. Hampton
ATTORNEYS

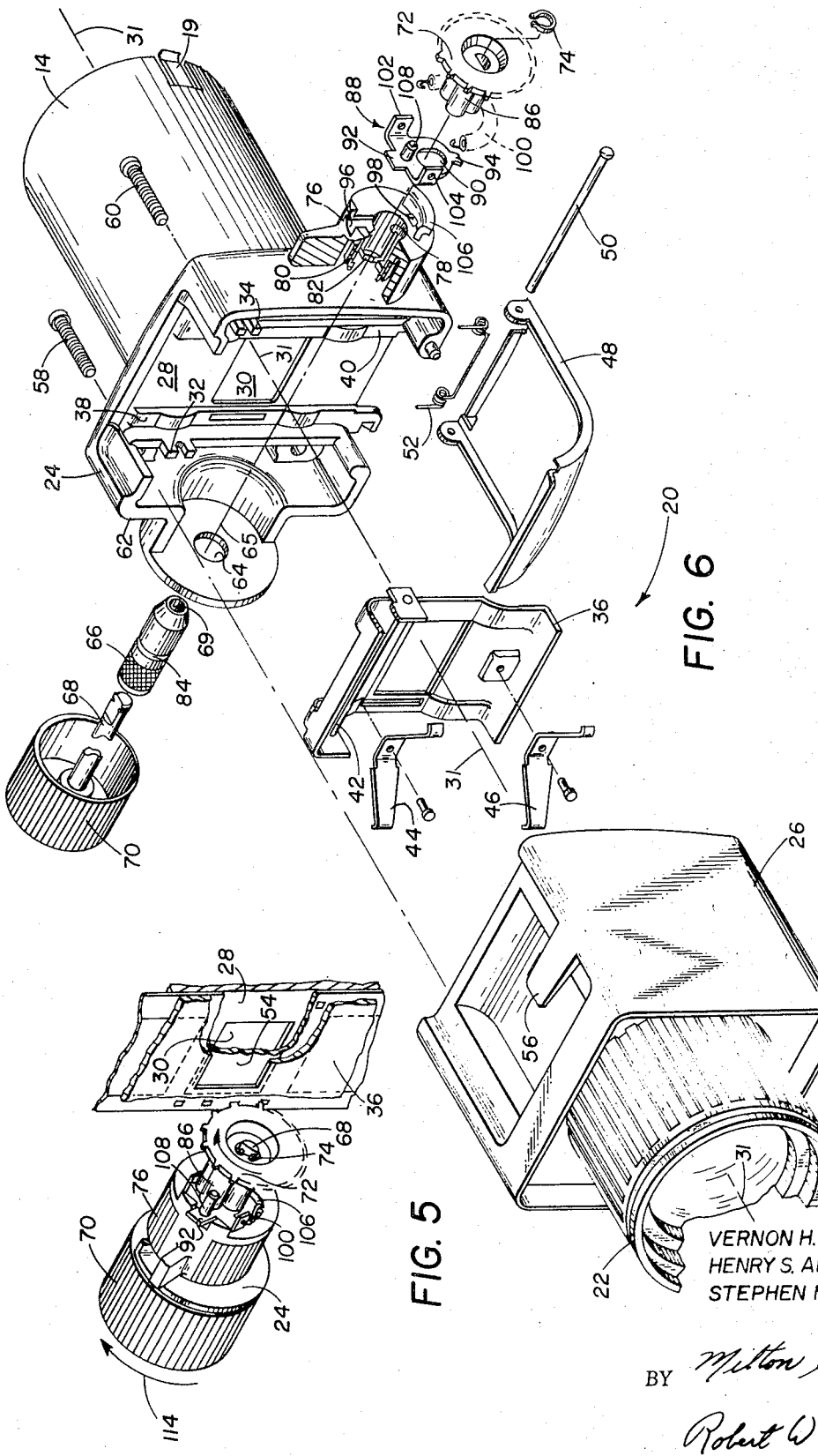

FILMSTRIP ADAPTER FOR SLIDE PROJECTORS

BACKGROUND OF THE INVENTION

1. Field of the Invention

The present invention relates to filmstrip projection, and more specifically to an adapter to accommodate to a slide projector for showing successive frames of a filmstrip.

2. Description of the Prior Art

Mechanisms for advancing and aligning filmstrips in projectors designed specifically for filmstrips are well known in the art. One such mechanism is shown in U.S. Pat. No. 3,003,393 in the name of Paul J. Kilday. In the device shown in that patent, film is advanced from a supply at the top of the mechanism, and fed through a film gate to a takeup basket. The filmstrip is driven through the gate by a sprocket mechanism positioned below the gate and consisting of a pair of sprocket wheels mounted on a shaft which can be manually rotated by way of a film advance knob. Frame alignment is accomplished by means of a manual framing sleeve carried by the sprocket shaft, and a detent mechanism is provided on the shaft to advance one frame per detent. While such a mechanism serves its intended function, the filmstrip must be provided with a long leader so that the leading end of the strip will reach the sprocket wheel before the first frame to be shown reaches the film gate. Further, the projector shown in the Kilday patent is not designed to accommodate slides, resulting in the need for a separate projector if both types of projection is desired.

U.S. Pat. No. 2,793,563 to Elmer V. Koskela is directed to a combination filmstrip and slide projector which is a single projector in which a plurality of different types of film-feeding devices may be inserted. However, this approach would not be suitable for a buyer who already possessed a standard slide projector and wished to be able to adapt it to a strip projector. Further, the construction shown by Koskela would not be capable of handling the improved mechanisms developed in recent years for showing multiple slides from large magazines.

Adapters for filmstrip projection from motion picture projectors are also known. One such adapter is shown in U.S. Pat. No. 2,438,333 to Joseph E. Pickman. That patent discloses an adapter having a housing with a tubular member at one end suitable for insertion into the light projecting tube of a motion picture projector.

SUMMARY OF THE INVENTION

An object of the present invention is to provide a filmstrip adapter for a slide projector.

Another object of the present invention is to provide a mechanism for advancing filmstrips past a film gate without the necessity of long leaders on the filmstrip, and capable of accommodating long or short filmstrips.

Still another object of the present invention is to provide a slide projector adapter for showing filmstrips, the adapter having a supply spool molded integrally with other portions of the adapter and a spring biased takeup basket for receiving that portion of the filmstrip which has passed the film gate.

Yet another object of the present invention is to provide a film-advancing mechanism for centering individual frames in a film gate and for advancing the film frame by frame.

In accordance with a preferred embodiment of the invention, the adapter has a tubular member of a size suitable for being removably inserted in the light-projecting tube of a slide projector. A housing on the front of the tubular member includes a film gate aligned with that member and a film drive sprocket aligned with the film gate. The drive sprocket is carried on a shaft extending through a wall of the housing to a position outside of the housing where an advance knob is attached for manual operation. The shaft is rotatably supported in a bearing sleeve which is rigidly held in the housing. A framing knob is frictionally secured to the sleeve. Detent means interconnect the framing knob and the drive sprocket so that when the advance knob and shaft is manually turned, the drive sprocket will be rotated through the exact angular displacement necessary for advancing the filmstrip one frame per detent. Friction between the framing knob and the bearing sleeve is sufficient to overcome the rotational force component transferred through the detent means from the drive sprocket to the framing knob so that the framing knob does not move when the shaft is manually turned. However, when the framing knob is turned manually, this motion is transmitted through the detent means to the drive sprocket, shaft and advance knob.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIGS. 3–5 are fragmentary perspective views of the film advance and framing mechanism of the adapter shown in FIG. 1; and FIG. 6 is an exploded view of the adapter shown in FIG. 1.

DESCRIPTION OF THE PREFERRED EMBODIMENT

Figure 1:
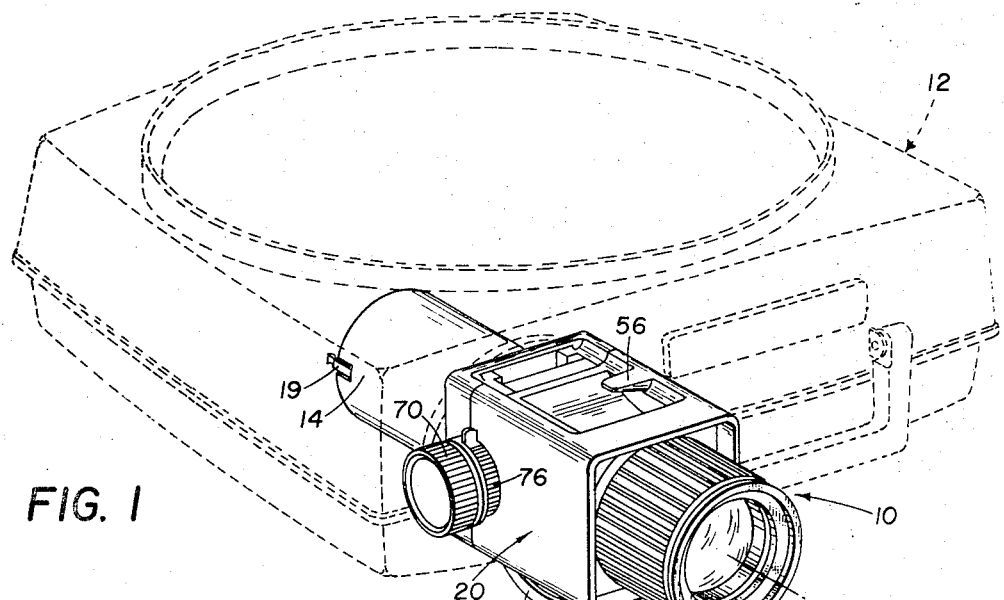
FIG. 1 is a perspective view of the adapter of the present invention showing the manner of its attachment to a conventional slide projector.

The present invention relates to an adapter to be used on conventional slide projectors for showing pictures using filmstrips. FIG. 1 shows the adapter, designated generally by reference numeral 10 as it would be mounted in the light projecting tube of a conventional slide projector 12. The slide projector shown in FIG. 1 is of the type having a slide tray mounted for rotation about a vertical axis. However, the adapter of the present invention is also suitable for use in other types of slide projectors.

Figure 2:
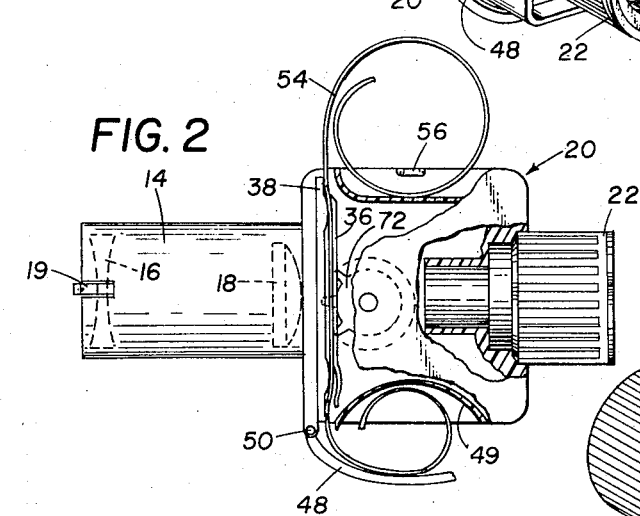
FIG. 2 is a partially segmental and sectional view of the adapter shown in FIG. 1.

The adapter has three main body portions. Referring to FIGS. 1 and 2, the first portion is a tubular member or hub portion 14 of a size permitting insertion into the light-projecting tube of slide projector 12. The hub portion carries a two component condenser made up of a negative component 16 and a positive component 18 at least one of which is preferably, of heat-absorbing glass. The heat absorption characteristics of the condenser serve to protect the film being viewed. A latch 19 is provided to cooperate with the light-projecting tube to hold the adapter in place yet to permit rotation of the adapter to accommodate either horizontal or vertical film formats.

A second body portion 20, the details of which will be set forth below in greater detail, is carried on the front end of hub portion 14. A third body portion, projection lens section 22 is mounted on housing portion 20 for projecting an image of the film onto a projection screen. Although the above-described optical system has been found to be very suitable, it will be understood by those skilled in the art that other optics may be used in the adapter.

Referring to FIG. 6, housing portion 20 is formed of two main, molded sections, a rear housing section 24 and a front housing 26. Rear housing section 24 has a backwall 28 with an opening 30 forming a part of a film gate. Opening 30 frames the portion of the film being projected, and has a film gate axis 31, shown in FIG. 6, passing through the center of opening 30 and running perpendicular to the plane of the film. Backwall 28 carries a pair of forwardly facing notches 32 and 34.

The film gate is completed by a pressure pad 36 which is formed to fit against mating molded parts 38 and 40 of the rear housing to form means defining a film path therewith. Pressure pad 36 has a pin 42 which fits into notches 32 and 34 for locating the pad in the housing. The pressure pad is held against the rear housing by a pair of springs 44 and 46 which abut suitable parts, not shown, of front housing section 26.

A takeup basket 48 is pivotally mounted below rear housing section 24 by a pin 50 and cooperates with a molded section 49 of front housing section 26 to receive the filmstrip. A spring 52 is provided to bias takeup basket 48 about pin 50 in a counterclockwise direction as viewed in FIG. 2. As a strip of film 54 is fed through the film gate to takeup basket 48, the takeup basket is rotated in a clockwise direction as needed to accommodate the film. When the film has been fully advanced past the gate the filmstrip will be rolled in basket 48 and can be removed by rotating the basket about pin 50 until the roll is free.

Front housing section 26 is provided with an integrally molded supply spool 56 in its upper wall. The two housing sections are held together by any suitable means, a pair of bolts 58 and 60 being shown in the preferred embodiment. Rear housing section 24 has a sidewall 62 with a circular opening 64 having an axis 65 running normal to and intercepting the film gate axis. A bearing sleeve 66 is fitted into opening 64 and acts as a rigid part of the housing. A film advance shaft 68 is rotatably carried in a bore 69 through bearing sleeve 66. The outer end of advance shaft 68 is provided with a film advance knob 70 while the inner end of the shaft is rigidly attached to a film drive sprocket 72 so that rotation of advance knob 70 rotates sprocket wheel 72 to draw the filmstrip through the gate. Sprocket wheel 72 is secured to shaft 68 by a split ring washer 74.

A framing knob 76 has a split hub 78 provided with a compression ring 80 and a plurality of inwardly extending fingers 82. The framing knob is pressed onto the outer diameter of bearing sleeve 66 from the inside of rear housing section 24 until fingers 82 are locked in a circumferential groove 84 about sleeve 66. Framing knob 76 is free to rotate about sleeve 66, but there is relatively high degree of friction between the knob and the shaft for purposes to be set forth below.

Figure 3:
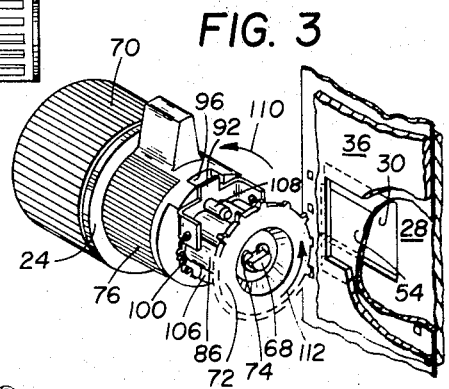

Framing knob 76 is connected to drive sprocket 72 through detent means consisting of a plurality of lobes 86 on the drive sprocket and a detent member 88. Detent member 88 has an elongated hole 90 through which shaft 68 passes. A pair of tabs 92 and 94 cooperate with slots 96 and 98 in framing knob 76, respectively, for guiding the movement of detent member 88 in a vertical direction as shown in FIGS. 3 and 6. A coil spring 100 is attached to lugs 102 and 104 of detent member 88 and passes about a projection 106 on framing knob 76 to resiliently pull detent member 88 radially inwardly. A pin 108 on detent member 88 contacts lobes 86 on drive sprocket 72 so that as advance knob 70, shaft 68 and drive sprocket 72 are turned, detent member 88 is forced to move radially outwardly against the force of spring 100 by the cam action of the lobes against pin 108. The frictional contact between split hub 78 and bearing sleeve 66 is sufficient to prevent framing knob 76 from turning. However, if framing knob 76 is turned manually, the rotational force of detent member 88 is transmitted through detent member 88 to lobes 86 and drive sprocket 72, the rotational component of force between pin 108 and the lobes being less than the radial force exerted upon the detent member by spring 100 so that the entire assembly including framing knob 76, drive sprocket 72, shaft 68 and advance knob 70 is rotated as one part.

In operation, filmstrip 54 is loaded onto spool 56 and the leading end is threaded into the film gate. Since drive sprocket 72 is aligned with the film gate, it is not necessary to provide a leader on the filmstrip as is required in conventional filmstrip advance mechanisms having the drive sprocket below the film gate.

Figure 4:
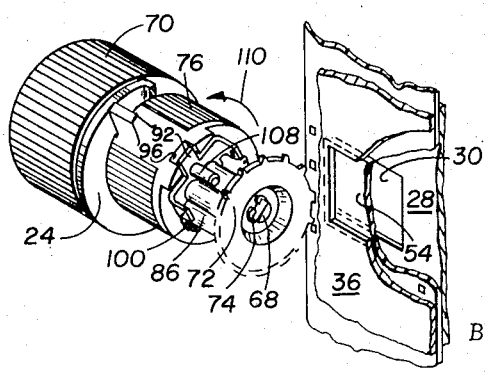

When the film reaches drive sprocket 72, advance knob 70 is turned so that drive sprocket 72 catches the first perforation and draws the film downwardly until the first frame reaches the film gate. Because the detent means advances the film a frame length at a time, it is quite unlikely that the frame will be aligned with the gate. For instance, the frame may be out of alignment below the film gate as shown in FIG. 3. If this is the case, framing knob 76 is rotated as shown in FIG. 4 in the direction shown by arrow 110. This rotates the entire assembly including drive sprocket 72 in the direction shown by arrow 112 (FIG. 3). Rotation of sprocket 72 raises the filmstrip until it is properly framed. If the film frame is initially above the film gate, rotation of framing knob 76 in the opposite direction will properly align it.

Once the film has been aligned in the gate, framing knob 76 is left in the position. Film advancement is now accomplished by turning advance knob 70 in the direction shown by arrow 114 in FIG. 5. By having the ratio of the number of teeth on sprocket 72 to the number of lobes 86 equal to four provides rotation of four teeth per detent. This is the number necessary for advancing one frame of standard half frame 35 mm. filmstrip. Should the film become out of alignment, it can easily be readjusted by rotation of framing knob 76 as described above.

The invention has been described in detail with particular reference to a preferred embodiment thereof, but it will be understood that variations and modifications can be effected within the spirit and scope of the invention.

We claim:

1. A device for advancing and aligning a strip of film in a filmstrip projector, said device comprising:
    a. a housing having
        1. a first wall, and
        2. a second wall intersecting said first wall and normal thereto;
    b. means on said first wall defining a film gate having an opening through which projection light may pass, the center of said opening being intercepted by a plane normal to both said first and second walls;
    c. means on said second wall defining a circular opening having an axis lying in said plane;
    d. a cylindrical sleeve in said circular opening, said sleeve having a bore extending therethrough coaxial with said circular opening;
    e. a framing knob held to said sleeve for rotation relative to said housing;
    f. a shaft rotatably extending through said bore;
    g. a drive sprocket on said shaft adjacent said gate for engaging the strip of film and drawing it past said gate; and
    h. detent means interconnecting said shaft and said framing knob for controlling advancement of the filmstrip at a rate of one frame per engagement of a detent.

2. A device for advancing and aligning a strip of film in a filmstrip projector as defined in claim 1 wherein said detent means comprises:
    a. a plurality of lobes fixed to said shaft for rotation therewith; and
    b. a member slidably mounted on said framing knob and having
        1. means for riding along said lobes, and
        2. spring means for biasing said last-mentioned means toward said lobes.

3. An adapter for showing still pictures from a filmstrip in a slide projector having a light-projecting tube, said adapter comprising:
    a. a tubular member of a size adapted to be removably inserted in the light-projecting tube;
    b. a housing on said tube, said housing having
        1. a first wall, and
        2. a second wall intersecting said first wall and normal thereto;
    c. means on said first wall defining a film gate having an opening through which projection light may pass, the center of said opening being intercepted by a plane normal to both said first and second walls;
    d. means on said second wall defining a circular opening having an axis lying in said plane;
    e. a cylindrical sleeve in said circular opening, said sleeve having a bore extending therethrough coaxial with said circular opening;
    f. a framing knob held to said sleeve for rotation relative to said housing;
    g. a shaft rotatably extending through said bore;

h. a drive sprocket on said shaft adjacent said gate for engaging the strip of film and drawing it through said gate; and i. detent means interconnecting said shaft and said framing knob for controlling advancement of the filmstrip at a rate of one frame per engagement of a detent.

4. A device for advancing and aligning a strip of film in a filmstrip projector as defined in claim 3 wherein said detent means comprises:

a. a plurality of lobes fixed to said shaft for rotation therewith; and b. a member slidably mounted on said framing knob and having 1. means for riding along said lobes, and
2. spring means for biasing said last mentioned means toward said lobes.

5. A device for advancing and aligning a strip of film in a filmstrip projector as defined in claim 3 wherein said tubular member has means for releasably preventing axial movement in the light-projecting tube while permitting free rotational movement, whereby either horizontal or vertical formats may be shown.

* * * * *